United States Patent
Nishino

(10) Patent No.: US 8,305,785 B2
(45) Date of Patent: Nov. 6, 2012

(54) POWER SOURCE APPARATUS

(75) Inventor: Tatsuki Nishino, Tokyo (JP)

(73) Assignee: Sony Corporation, Tokyo (JP)

( * ) Notice: Subject to any disclaimer, the term of this patent is extended or adjusted under 35 U.S.C. 154(b) by 130 days.

(21) Appl. No.: 12/662,024

(22) Filed: Mar. 29, 2010

(65) Prior Publication Data

US 2010/0302824 A1    Dec. 2, 2010

(30) Foreign Application Priority Data

May 29, 2009   (JP) ................... 2009-130099

(51) Int. Cl.
*H02M 7/217* (2006.01)
*H02M 3/335* (2006.01)
(52) U.S. Cl. .......................... 363/89; 363/127
(58) Field of Classification Search ............... 363/21.06, 363/21.14, 80, 81, 89, 127, 17, 21.02
See application file for complete search history.

(56) References Cited

U.S. PATENT DOCUMENTS

| | | | | |
|---|---|---|---|---|
| 7,599,198 B2 * | 10/2009 | Tao et al. | ......................... | 363/17 |
| 7,633,780 B2 * | 12/2009 | Endo et al. | ...................... | 363/89 |
| 7,764,516 B2 * | 7/2010 | Yang | ........................... | 363/21.06 |
| 7,796,404 B2 * | 9/2010 | Reddy | ............................... | 363/16 |
| 7,830,684 B2 * | 11/2010 | Taylor | .............................. | 363/52 |
| 7,848,118 B2 * | 12/2010 | Shimada et al. | ................ | 363/17 |

* cited by examiner

*Primary Examiner* — Gary L Laxton
(74) *Attorney, Agent, or Firm* — Rader Fishman & Grauer, PLLC

(57) ABSTRACT

Power source apparatus utilizing a synchronous rectification system including a main transformer having a primary coil, and two secondary coils connected to each other by a tap mutually electromagnetically coupled to the primary coil. The power source apparatus includes a gate driver generating a first drive signal and a second drive signal to a gate of a first field effect transistor and to a gate of a second field effect transistor, respectively. The first field effect transistor and the second field effect transistor are turned on and off alternative by the gate driver.

6 Claims, 6 Drawing Sheets

F I G . 1
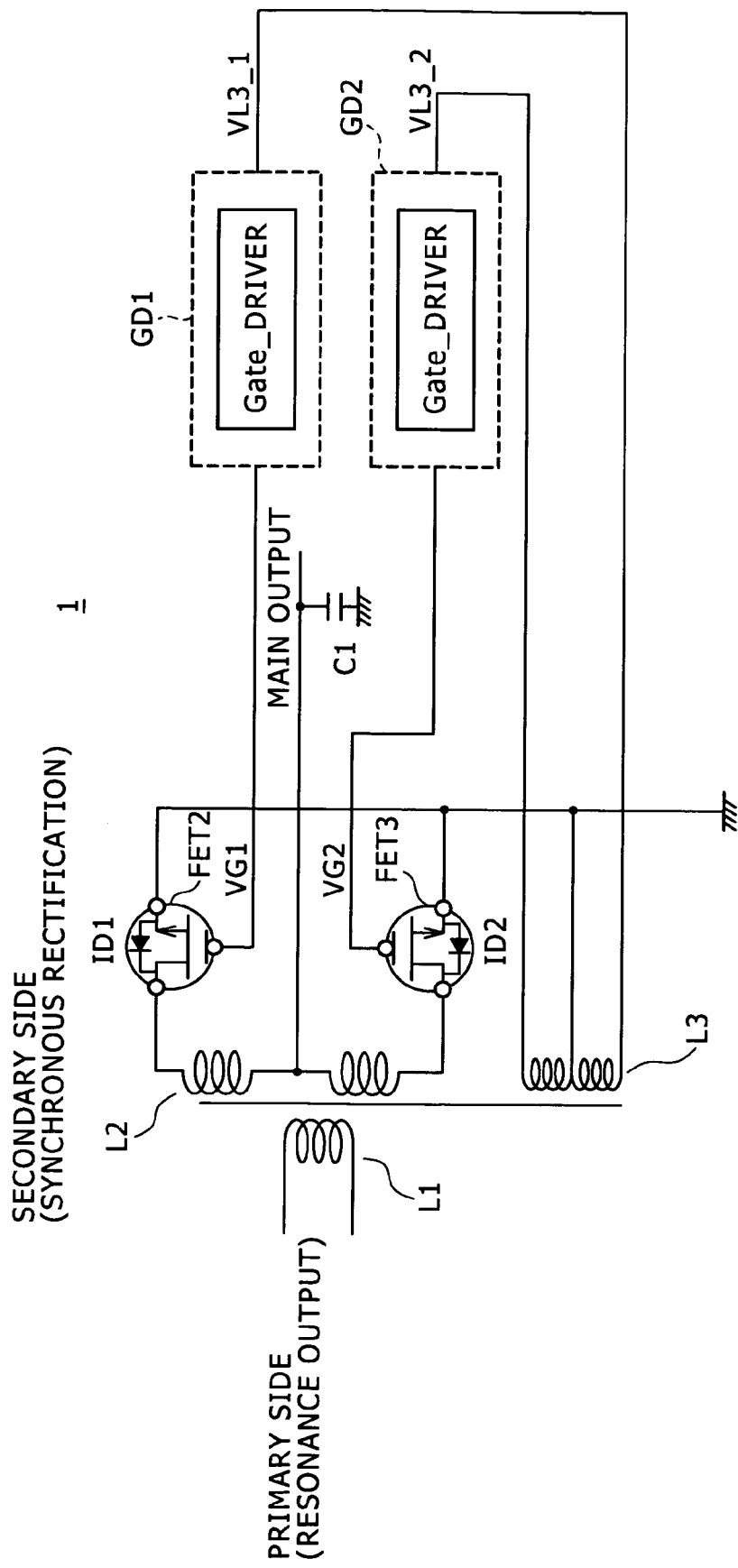

F I G. 2
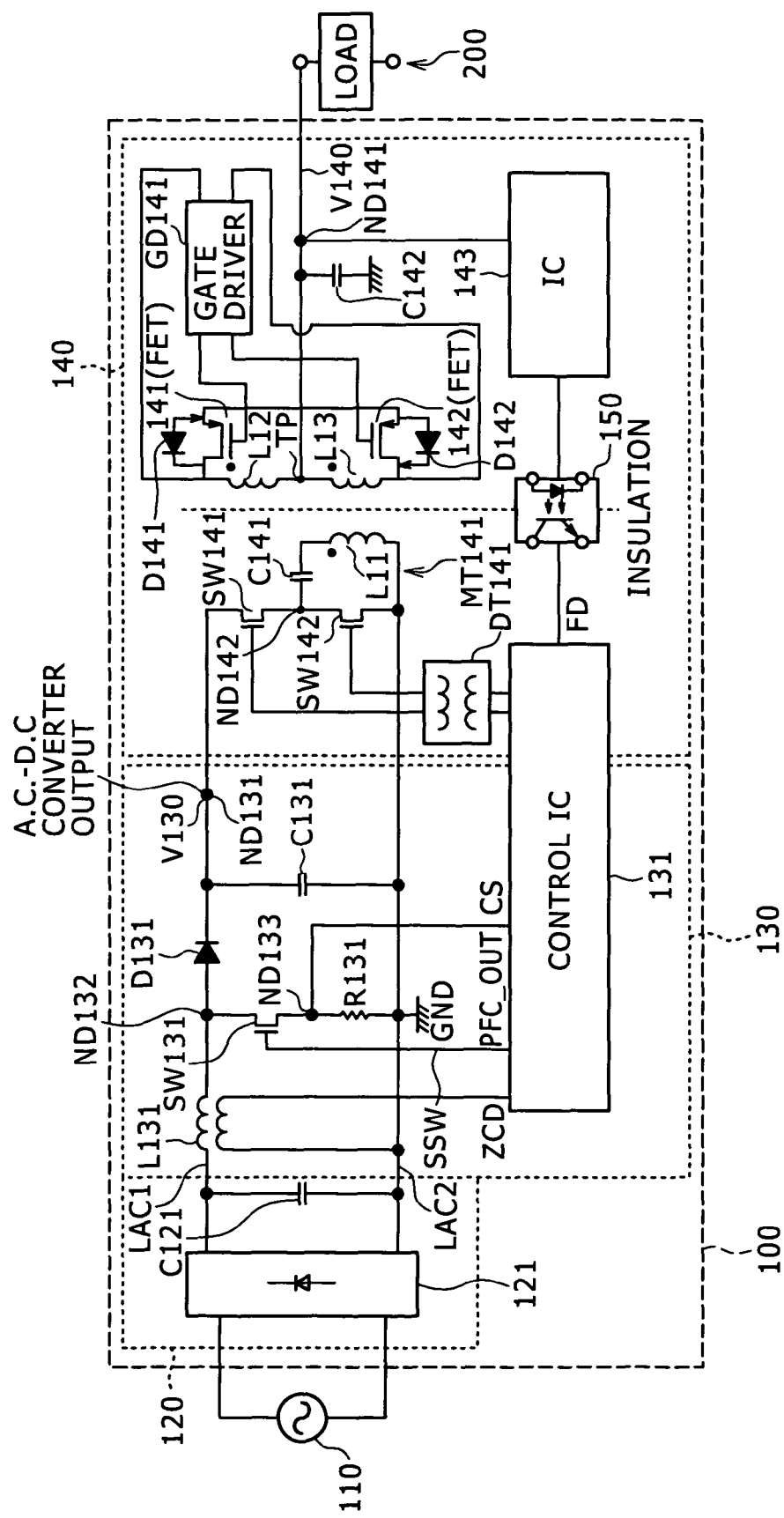

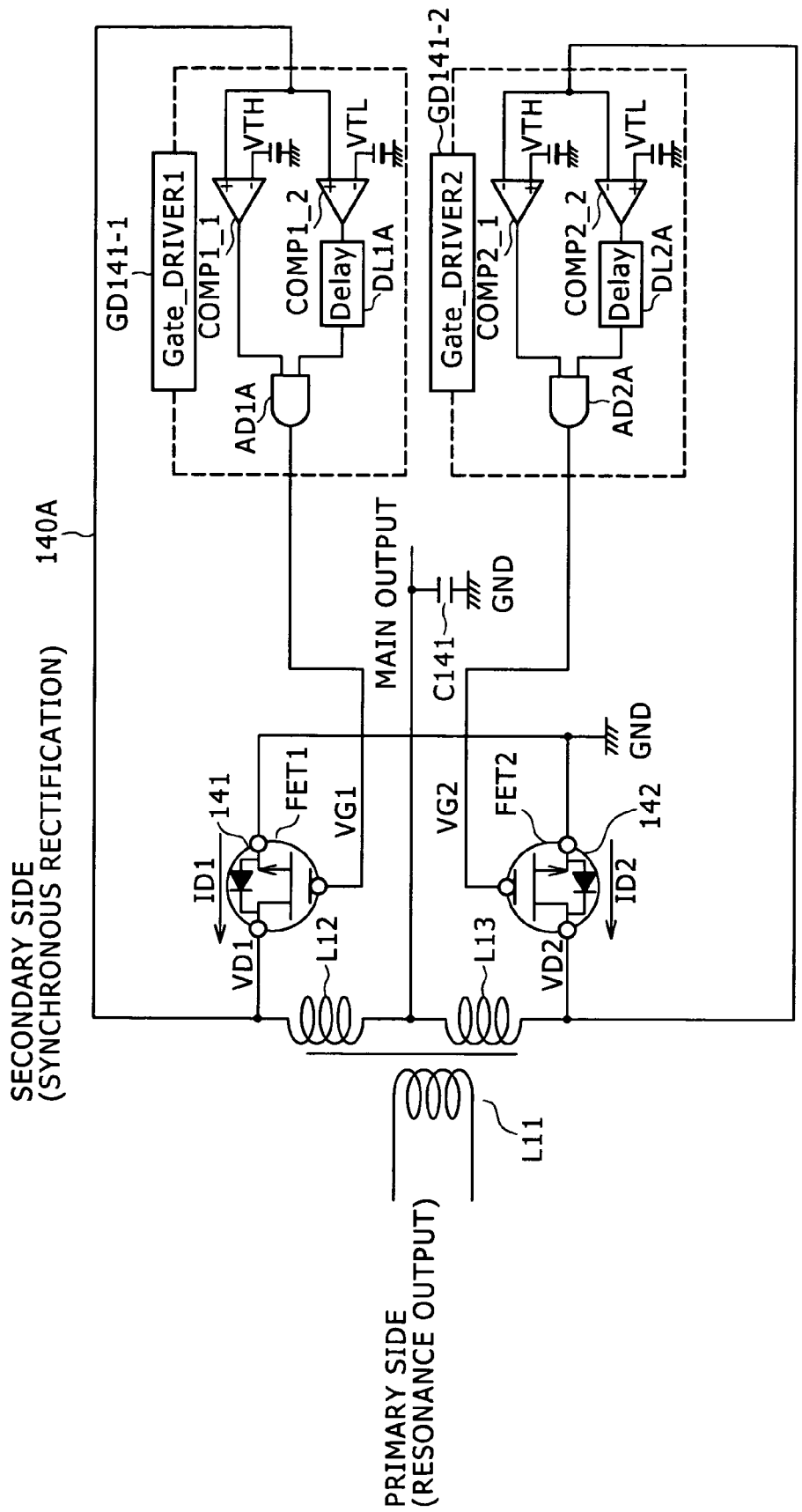
F I G. 5

POWER SOURCE APPARATUS

BACKGROUND OF THE INVENTION

1. Field of the Invention

The present invention relates to a power source apparatus for rectifying an A.C. (Alternating Current) voltage supplied from an A.C. power source to generate a stable D.C. (Direct Current) voltage.

2. Description of the Related Art

A power source board used in a game console, a television set or the like is equipped with an A.C.-D.C. power source apparatus for converting a home A.C. input voltage into a D.C. output voltage.

Although there are some kinds of converter systems used in the power source apparatus, a system which is most widely used in the power source requiring an electric power of 100 W or more is a full-wave current resonance system.

When the full-wave current resonance system is used in the power source apparatus, a secondary-side circuit alternately carries out a rectifying operation by using two pairs of rectifying diodes.

In addition, when a loss dissipated in each of the diodes used in the secondary-side circuit is desired to be suppressed, a field effect transistor (FET) is substituted for each of the diodes, and a synchronous rectification operation is carried out by using a driving circuit.

When the synchronous rectification operation is carried out for the secondary-side circuit by utilizing the full-wave current resonance system, a driving method using a tertiary winding is known as a main driving method.

FIG. 1 is a circuit diagram showing an example of a configuration of a power source apparatus utilizing the full-wave current resonance system using a tertiary winding of a secondary-side circuit.

This power source apparatus 1 includes a primary coil L1, a secondary coil L2, a tertiary coil L3, a field effect transistor FET2, and a field effect transistor FET3, and gate drivers GD1 and GD2.

In the power source apparatus 1, the coil L3 is used as a tertiary winding, and a pulse is induced in the tertiary coil L3 so as to correspond to the resonance from the primary side, and gates of the field effect transistors FET2 and FET3 are driven by the gate drivers GD1 and GD2, respectively.

SUMMARY OF THE INVENTION

However, the power source apparatus 1 utilizing the full-wave current resonance system described above involves the following disadvantages.

Firstly, the tertiary winding needs to be additionally provided in the power source apparatus, which causes an increase in cost, and scale-up of the power source apparatus.

Secondary, since it is necessary to avoid a timing at which the two FETs are turned ON at the same time, it is necessary to newly provide a timing adjusting circuit in the power source apparatus.

In this case, it is difficult to adjust the timing, and thus it takes a lot of time to design the power source board of the power source apparatus.

Thirdly, since the FET is not turned ON or OFF by detecting a current being caused to flow through the FET, there is the possibility that the power source apparatus 1 malfunctions depending on the state of the resonance.

The present invention has been made in order to solve the problems described above, and it is therefore desirable to provide a power source apparatus in which an increase in cost, and scale-up of the power source apparatus can be prevented, a timing adjusting circuit needs not to be provided, and malfunction of the power source apparatus depending on a state of resonance can be prevented.

In order to attain the desire described above, according to an embodiment of the present invention, there is provided a power source apparatus utilizing a synchronous rectification system including: a main transformer having a primary coil, and a first secondary coil and a second secondary coil having one end sides connected to each other through a tap mutually electromagnetically coupled to the primary coil; and a first field effect transistor having a drain connected to the other end of the first secondary coil, a source connected to a reference electric potential, and a gate to which a first drive signal is supplied. The power source apparatus further includes: a second field effect transistor having a drain connected to the other end of the second secondary coil, a source connected to the reference electric potential, and a gate to which a second drive signal is supplied; and a gate driver for generating the first drive signal and the second drive signal in accordance with a drain voltage of the first field effect transistor and a drain voltage of the second field effect transistor, for driving the first field effect transistor and the second field effect transistor in a complementary style. The gate driver generates the first drive signal and the second drive signal in such a way that after the other field effect transistor of the first field effect transistor and the second field effect transistor is turned OFF at a moment at which a current is generated in one field effect transistor of the first field effect transistor and the second field effect transistor, the one field effect transistor is turned ON.

According to another embodiment of the present invention, there is provided a power source apparatus including: a first converter for converting an alternating current voltage into a first direct current voltage; and a second converter for converting the first direct current voltage obtained by the first converter into a second direct current voltage, the second converter adopting a synchronous rectification system on a secondary side. The second converter includes: a main transformer having a primary coil, and a first secondary coil and a second secondary coil having one end sides connected to each other through a tap mutually electromagnetically coupled to the primary coil; and a first field effect transistor having a drain connected to the other end of the first secondary coil, a source connected to a reference electric potential, and a gate to which a first drive signal is supplied. The second converter further includes: a second field effect transistor having a drain connected to the other end of the second secondary coil, a source connected to the reference electric potential, and a gate to which a second drive signal is supplied; and a gate driver for generating the first drive signal and the second drive signal in accordance with a drain voltage of the first field effect transistor and a drain voltage of the second field effect transistor, for driving the first field effect transistor and the second field effect transistor in a complementary style. The gate driver generates the first drive signal and the second drive signal in such a way that after the other field effect transistor of the first field effect transistor and the second field effect transistor is turned OFF at a moment at which a current is generated in one field effect transistor of the first field effect transistor and the second field effect transistor, the one field effect transistor is turned ON.

As set forth hereinabove, according to the present invention, it is possible to provide the power source apparatus in which the increase in cost, and the scale-up of the power source apparatus can be prevented, the timing adjusting circuit needs not to be provided, and the malfunction of the power source apparatus depending on the state of the resonance can be prevented.

BRIEF DESCRIPTION OF THE DRAWINGS

FIG. 1 is a circuit diagram, partly in block, showing an example of a configuration of a power source apparatus utilizing a full-wave resonance system using a tertiary winding of a secondary-side circuit in the related art;

FIG. 2 is a circuit diagram, partly in block, showing an outline of an entire configuration of a power source apparatus, used for an electronic apparatus to which an electric power is supplied from an A.C. power source, according to an embodiment of the present invention;

FIG. 5 is a circuit diagram showing a configuration of a comparative example of a D.C.-D.C. converter;

DETAILED DESCRIPTION OF THE PREFERRED EMBODIMENTS

Figure 3:
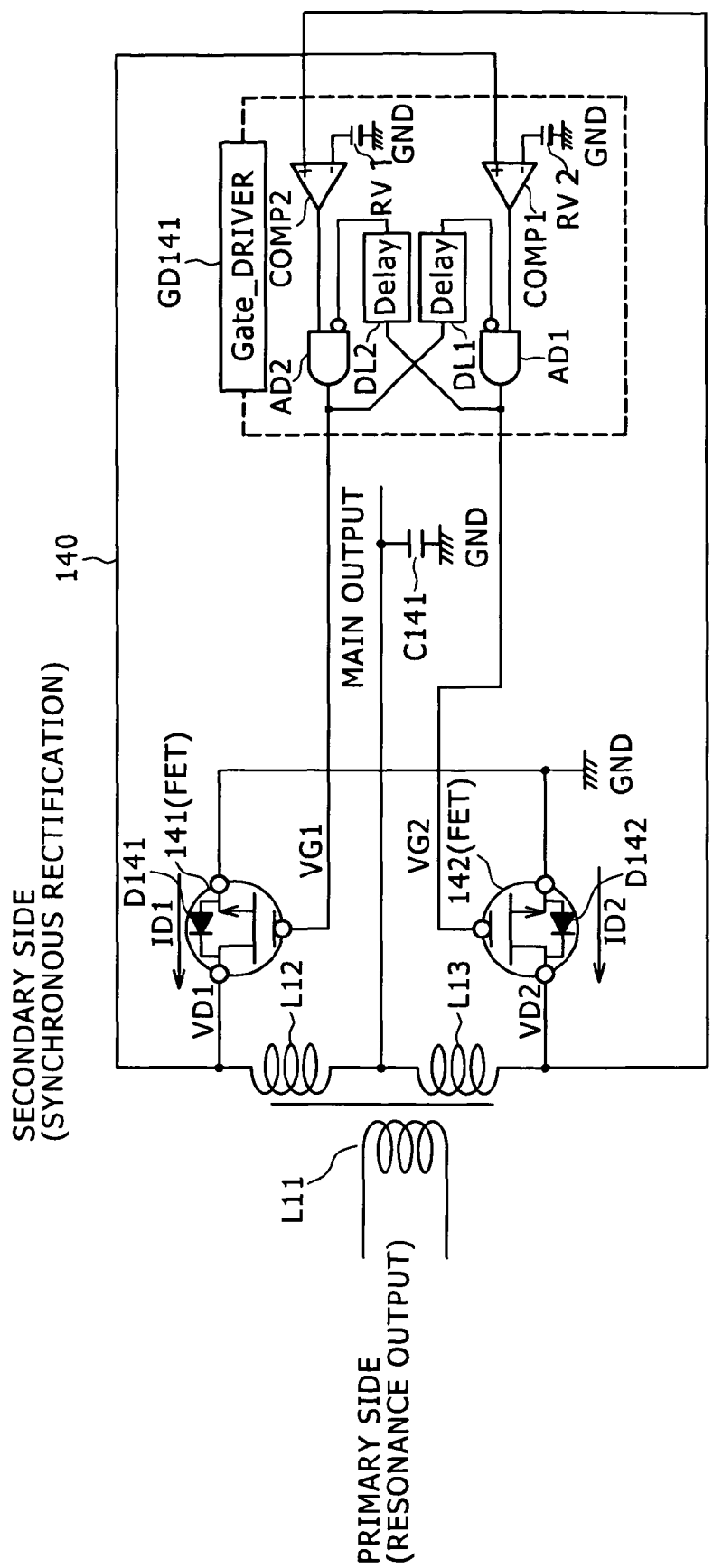
FIG. 3 is a circuit diagram showing a concrete configuration of a circuit, on a secondary side, including a gate driver of a D.C.-D.C. converter in the power source apparatus according to the embodiment of the present invention.

The preferred embodiments of the present invention will be described in detail hereinafter with reference to the accompanying drawings.

It is noted that the description will be given below in accordance with the following order.

1. Outline of Entire Configuration of Power Source Apparatus
2. Configuration of A.C. Line Signal Detecting Device
3. Change of Embodiment

1. Outline of Entire Configuration of Power Source Apparatus

FIG. 2 is a circuit diagram, partly in block, showing a configuration of a power source apparatus, for an electric apparatus to which an electric power is supplied from an A.C. power source, according to an embodiment of the present invention.

The power source apparatus 100 according to the embodiment of the present invention is used in the electronic apparatus 200 to which an electric power is supplied from an A.C. power source such as a home socket (commercial power source).

A game console or a television receiver, for example, corresponds to the electronic apparatus 200.

The power source apparatus 100 includes an A.C. power source 110, an electric power inputting portion 120, an A.C.-D.C. converter 130 as a first comparator, a D.C.-D.C. converter 140 as a second comparator, and a photocoupler 150.

The electric power inputting portion 120 includes a rectifying circuit 121 and an input capacitor C121.

The input capacitor C121 is connected between a first A.C. line LAC1 and a second A.C. line LAC2 on an output side of the rectifying circuit 121.

In the electric power inputting portion 120, an A.C. voltage supplied from the A.C. power source 110 is rectified by the rectifying circuit 121, and the resulting voltage is outputted across the first A.C. line LAC1 and the second A.C. line LAC2.

A Power Factor Correction (PFC) converter is generally applied to the A.C.-D.C. converter 130.

The A.C.-D.C. converter 130 includes a choke coil L131, a switching element SW131, a current detecting resistor R131, a diode D131, and an output capacitor C131.

In addition, the A.C.-D.C. converter 130 also includes a control circuit (a semiconductor integrated circuit, i.e., a control IC) 131.

In addition, the A.C.-D.C. converter 130 also includes an output node ND131 of a voltage V130, and intermediate nodes ND132 and ND133.

The choke coil L131 is connected between the A.C. lines LAC1 and LAC2 which are connected between output terminals of the rectifying circuit 121. One end of the choke coil L131 is connected to a terminal ZCD of the control IC 131.

The switching element SW131 is composed of an re-channel insulated gate field effect transistor (an FET, i.e., an NMOS transistor).

An anode of the diode D131 is connected to one end of the choke coil L131 on the first A.C. line LAC1 side, and a connection point between the one end of the choke coil L131 and the anode of the diode D131 forms a node ND132.

A cathode of the diode D131 is connected to a node ND131.

A drain of the switching element SW131 is connected to the first A.C. line LAC1, a source of the switching element SW131 is connected to one end of the current detecting resistor R131, and a connection point between the source of the switching element SW131 and the one end of the current detecting resistor R131 forms a node ND133.

A gate as a control terminal of the switching element SW131 is connected to a terminal PFC_OUT of the control IC 131.

The other end of the current detecting resistor R131 is connected to the second A.C. line LAC2, and the second A.C. line LAC2 is connected to the ground GND.

In addition, the node ND133 is connected to a terminal CS of the control IC 131.

The switching element SW131 is controlled so as to be turned ON or OFF by the control IC 131.

The current detecting resistor R131 detects a current being caused to flow through the switching element SW131.

One end of the output capacitor C131 is connected to the cathode side (the node ND131) of the diode D131, and the other end of the output capacitor C131 is connected to the second A.C. line LAC2.

The control IC 131 is configured so as to be adapted to control (limit) an ON-time of the switching element SW131.

The control IC 131 has an output terminal PFC_OUT. In this case, a switching signal SSW in accordance with which the switching element SW131 can be periodically turned ON or OFF is outputted to the gate serving as the control terminal of the switching element SW131 through the output terminal PFC_OUT of the control IC 131.

The control IC 131 has a function of determining the ON-time of the switching signal SSW which is outputted through the output terminal PFC_OUT in accordance with a voltage developed at an output terminal VAO.

The control IC 131 has the input terminal CS. In this case, a voltage developed at the node ND133 connected to the current detecting resistor R131 for detecting the current being caused to flow through the switching element SW131 is inputted to the control IC 131 through the input terminal CS.

The control IC 131 has a function of capable of turning OFF the switching element SW131 as soon as the control IC 131 detects that the voltage developed at the input terminal CS has reached a predetermined voltage.

The control IC 131 has a terminal FD. In this case, a feedback signal of the output voltage from the D.C.-D.C. converter 140 is inputted to the terminal FD of the control IC 131 through the photocoupler 150.

The control IC 131 has a function of carrying out not only control for the switching element SW131 of the A.C.-D.C. converter 130, but also drive control for the D.C.-D.C. converter 140.

That is to say, the feature of the power source apparatus 100 of the embodiment is that the control for the A.C.-D.C. converter 130, and the control for the D.C.-D.C. converter 140 are carried out by the same control IC 131.

With the power source apparatus 100, the A.C. voltage supplied from the A.C. power source 110 is converted into an output voltage V130, from the A.C.-D.C. converter 140, as a first D.C. voltage of about 400 V by the A.C.-D.C. converter 130.

The output voltage V130 is further converted into a second D.C. voltage V140, for example, 12 V which is required for the electronic apparatus 200 by the insulated D.C.-D.C. converter 140 to be distributed to the electronic apparatus 200.

The insulated D.C.-D.C. converter 140 includes a main transformer MT141, switching elements SW141 and SW142, a capacitor C141, and a drive transformer DT141 on a primary side thereof.

In addition, the insulated D.C.-D.C. converter 140 includes field effect transistors (FETs) 141 and 142 each serving as a switching element, a capacitor C142, a gate driver GD141, and a feedback circuit (IC) 143 on a secondary side thereof.

The FET 141 corresponds to a first field effect transistor, and the FET 142 corresponds to a second field effect transistor.

The insulated D.C.-D.C. converter 140 includes an output node ND141 on the secondary side thereof.

Each of the switching elements SW141 and SW142 is composed of an n-channel insulated gate field effect transistor (an FET, i.e., an NMOS transistor).

A drain of the switching element SW141 is connected to the output node ND131 (the first A.C. line LAC1) of the A.C.-D.C. converter 130, a source of the switching element SW141 is connected to a drain of the switching element SW142, and a connection point between the source of the switching element SW141 and the drain of the switching element SW142 forms a node ND142.

A source of the switching element SW141 is connected to the second A.C. line LAC2.

Each of gates, of the switching elements SW141 and SW142, serving as control terminals is connected to a drive line of the drive transformer DT141.

The main transformer MT141 includes a primary coil L11 on a primary side thereof. One end (dot terminal) of the primary coil L11 is connected to the node ND142 through the capacitor C141, and the other end (non-dot terminal) of the primary coil L11 is connected to the second A.C. line LAC2.

The main transformer MT141 includes a first secondary coil L12 and a second secondary coil L13 which are connected to each other so as to obtain a forward polarity through a tap TP mutually electromagnetically coupled to the primary coil L11.

It should be noted that in FIG. 2, the relative polarities of the coils L11 to L13 are shown in the form of dots, respectively, so as to follow the standard notation.

Also, the forward polarity stated herein means that a non-dot terminal, having no dot, of the first secondary coil L12, and a dot terminal, having a dot, of the second secondary coil L13 are each connected to the tap TP.

A drain of the FET 141 is connected to the other end (dot terminal) of the first secondary coil L12, and a source of the FET 141 is connected to the ground GND (reference electric potential).

A gate serving as a control terminal of the FET 141 is connected to an output line of the first drive signal VG1 for the gate driver GD141.

The FET 141 includes a body diode D141 in which the forward direction is obtained from the source toward the drain.

A drain of the FET 142 is connected to the other end (non-dot terminal) of the second secondary coil L13, and a source of the FET 142 is connected to the ground GND (reference electric potential).

A gate serving as a control terminal of the FET 142 is connected to an output line of the second drive signal VG2 for the gate driver GD141.

The FET 142 includes a body diode D142 in which the forward direction is obtained from the source toward the drain.

Also, the capacitor C142 is connected between the output node ND141 and the ground GND.

The feedback circuit 143 outputs an output voltage from the output node ND141, for example, a divided voltage as a feedback signal to the photocoupler 150.

The photocoupler 150 converts the feedback signal inputted thereto into an optical signal, and then converts the optical signal into an electrical signal which is in turn supplied to the terminal FD of the control IC 131.

Here, a description will be given below with respect to a concrete configuration of the gate driver GD141 as a main portion on the secondary side of the insulated D.C.-D.C. converter 140 in the power source apparatus 100 of the embodiment.

[Configuration of Gate Driver]

FIG. 3 is a circuit diagram showing a concrete configuration of the secondary side circuit, including the gate driver GD141, of the insulated D.C.-D.C. converter 140 in the power source apparatus 100 of the embodiment.

The gate driver GD141 shown in FIG. 3 includes first and second comparators COMP1 and COMP2, 2-input AND gates AD1 and AD2, first and second delay circuits DL1 and DL2, and reference power sources RV1 and RV2.

A first circuit is composed of the AND gate AD1, and a second circuit is composed of the AND gate AD2.

A non-inverting input terminal (+) of the first comparator COMP1 is connected to a connection point between the other end (dot terminal) of the first secondary coil L12, and the drain of the first FET 141, and an inverting input terminal (−) of the first comparator COMP1 is connected to the reference power source RV1.

The first comparator COMP1 detects an electric potential of a drain-to-source voltage VDS of the first FET 141.

A first input terminal as a positive input of the AND gate AD1 is connected to an output terminal of the first comparator COMP1, and a second input terminal as a negative input of the AND gate AD1 is connected to an output terminal of the first delay circuit DL1.

An output terminal of the first AND gate AD1 is connected to each of an input terminal of the second delay circuit DL2, and the gate of the second FET 142.

The first AND gate AD1 outputs a gate drive signal VG2 to each of the input terminal of the second delay circuit DL2, and the gate of the second FET 142.

A non-inverting input terminal (+) of the second comparator COMP2 is connected to a connection point between the other end (non-dot terminal) of the second secondary coil L13, and the drain of the second FET 142. Also, an inverting input terminal (−) of the second comparator COMP2 is connected to the reference power source RV2.

The second comparator COMP2 detects an electric potential of a drain-to-source voltage VDS of the second FET 142.

A first input terminal as a positive input of the second AND gate AD2 is connected to an output terminal of the second comparator COMP2, and a second input terminal as a negative input of the second AND gate AD2 is connected to an output terminal of the second delay circuit DL2.

An output terminal of the AND gate AD2 is connected to each of an input terminal of the first delay circuit DL1, and the gate of the first FET 141.

The second AND gate AD2 outputs a gate drive signal VG1 to each of the input terminal of the second delay circuit DL2, and the gate of the first FET 141.

In this way, the insulated D.C.-D.C. converter 140 is configured by connecting the two comparators COMP1 and COMP2 for detecting the drain voltages of the first and second FETS 141 and 142 for synchronous rectification, respectively, and the two delay circuits DL1 and DL2 for creating a dead time in the form as illustrated in FIG. 3.

Next, a description will now be given in relation to FIG. 3 so as to focus an operation, on the secondary side, of the insulated D.C.-D.C. converter 140 utilizing the full-wave current resonance system.

FIGS. 4A to 4F are respectively timing charts explaining an operation, on the secondary side, of the insulated D.C.-D.C. converter utilizing the synchronous rectification system in the power source apparatus 100 of the embodiment.

Figure 4:
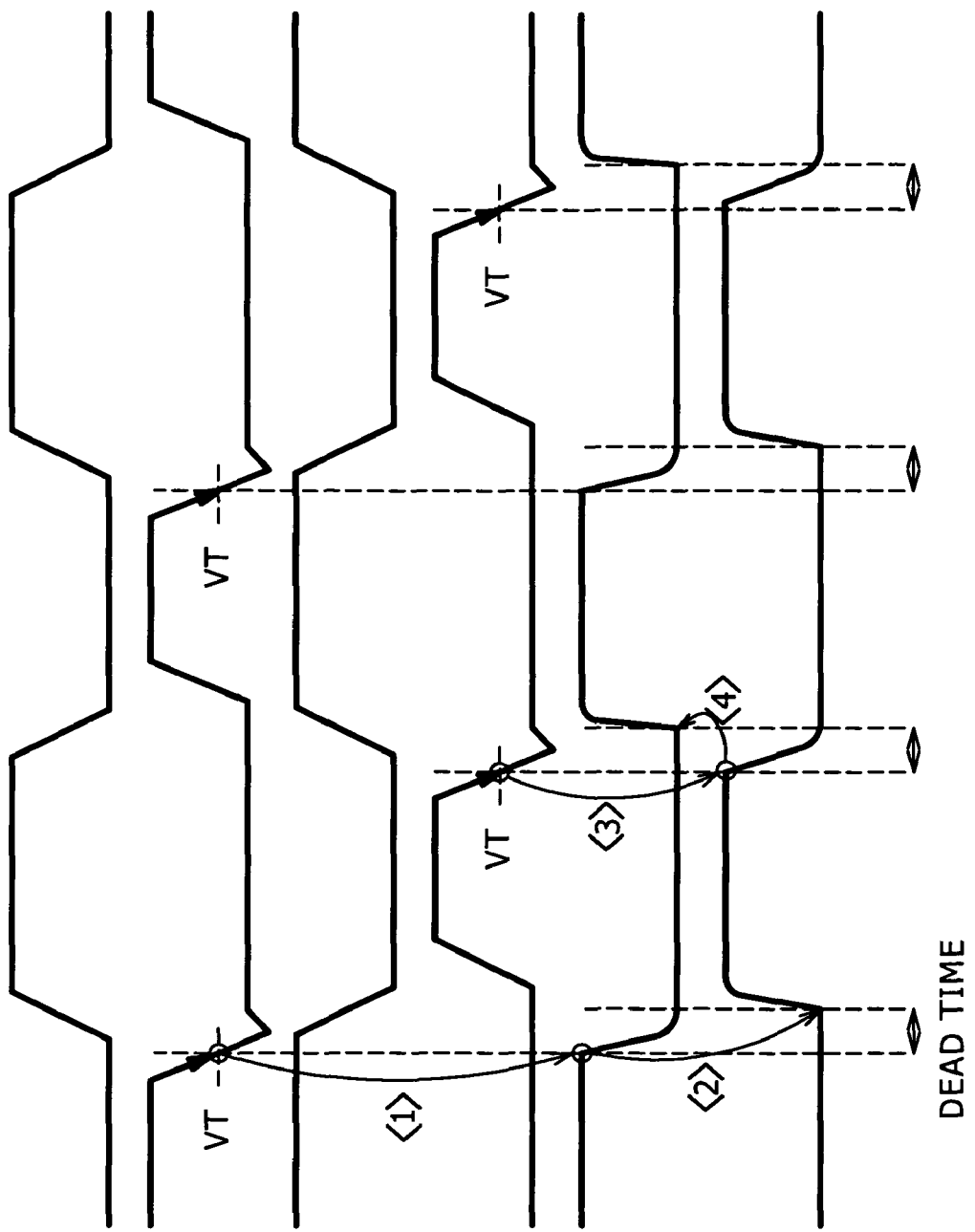
FIGS. 4A to 4F are respectively timing charts explaining an operation, on the secondary side, of the D.C.-D.C. converter utilizing a synchronous rectification system in the power source apparatus according to the embodiment of the present invention.

FIG. 4A shows a waveform of a current ID1 caused to flow through the first FET 141, FIG. 4B shows a waveform of a drain voltage VD1 of the first FET 141, FIG. 4C shows a waveform of a current ID2 caused to flow through the second FET 142, and FIG. 4D shows a waveform of a drain voltage VD2 of the second FET 142.

Also, FIG. 4E shows a waveform of a second drive signal VG2 of the second FET 142, and FIG. 4F shows a waveform of a first drive signal VG1 of the first FET 141.

Firstly, in response to the resonance operation on the primary side, pulses are induced in the first and second secondary coils L12 and L13 as well on the secondary side.

At this time, with regard to the drain-to-source voltage VDS of the first FET 141, a pulse having a electric potential corresponding to a turn ratio between the primary side coil and the secondary side coil is induced.

In addition, for this pulse, a direction of the coil is set so that 180° out-of-phase pulses are obtained in VDS1 and VDS2, respectively.

As a result, the currents ID1 and ID2 caused to flow through the first and second FETs 141 and 142, respectively, are alternately supplied to a main output so that the currents ID1 and ID2 are also 180° out of phase with each other.

<1> The drain voltage VD1 of the first FET 141 is changed from a High level (H) to a Low level (L) right before the current ID1 is caused to flow through the first FET 141.

At this time, the first comparator COMP1 having a threshold voltage VT detects a falling edge of the drain voltage VD1 of the first FET 141.

The second drive signal VG2 is changed from the High level (H) to the Low level (L) in accordance with the detection result obtained in the first comparator COMP1, thereby turning OFF the second FET 142 on the opposite side.

<2> After a. lapse of the dead time by the second delay circuit DL2 after the second FET 142 is turned OFF, the first drive signal VG1 is changed from the Low level (L) to the High level (H), thereby turning ON the first FET 141.

<3> Likewise, the drain voltage signal VD2 of the second FET 142 is changed from the High level (H) to the Low level (L) right before the current ID2 is caused to flow through the second FET 142, thereby turning OFF the first FET 141.

<4> Also, the first FET 141 is turned ON after a lapse of the dead time by the second delay circuit DL2.

By carrying out the operation described above, the operation for turning OFF the FET on the opposite side at a moment at which the currents are caused to flow through the FETs, and then turning ON the FET on one side is repeatedly carried out, thereby realizing the highly efficient and safe synchronous rectification operation.

In addition, the system is obtained in which an increase in cost and scale-up of the power source apparatus 100 are suppressed because the circuit is simple in configuration and does not require the tertiary wiring.

Comparative Example

Here, an insulated D.C.-D.C. converter in which two gate drivers are provided and two comparators are disposed in each of the gate drivers is considered as a comparison example.

FIG. 5 is a circuit diagram showing a configuration of the comparative example of the insulated D.C.-D.C. converter.

In the D.C.-D.C. converter 140A, a gate driver GD141-1 includes two comparators COMP1-1 and COMP1-2, a delay circuit DL1A, and a 2-input AND gate AD1A.

The comparator COMP1-1 compares a drain voltage VD1 of an FET 141 with a reference voltage VTH on a high level side.

The comparator COMP1-2 compares the drain voltage VD1 of the FET 141 with a reference voltage VTL on a low level side.

The AND gate AD1A obtains logical AND of an output from the comparator COMP1-1, and an output from the comparator COMP1-2 through the delay circuit DL1A, and outputs the logical AND as a drive signal VG1A to a gate of the FET 141.

In addition, in the D.C.-D.C. converter 140A, a gate driver GD141-2 includes two comparators COMP2-1 and COMP2-2, a delay circuit DL2A, and a 2-input AND gate AD2A.

The comparator COMP2-1 compares a drain voltage VD2 of an FET 142 with the reference voltage VTH on the high level side.

The comparator COMP2-2 compares the drain voltage VD2 of the FET 142 with the reference voltage VTL on the low level side.

The AND gate AD2A obtains logical AND of an output from the comparator COMP2-1, and an output from the comparator COMP2-2 through the delay circuit DL2A, and outputs the logical AND as a drive signal VG2A to a gate of the FET 142.

This configuration does not use the tertiary winding, and has two kinds of comparators for detecting source-to-drain voltages VDS of the FETs.

Since the current is caused to flow through the body diode of the FET when the current is caused to flow through the FET, the source-to-drain voltage VDS of the FET becomes a minus electric potential by the body diode.

A first threshold voltage is provided at this point, thereby turning ON the FET. Next, since the FET is turned ON, the source-to-drain voltage VDS of the FET decreases, so that the source-to-drain voltage VDS of the FET becomes a value of a product of an ON resistance of the FET, and the current caused to flow through the FET.

Since absence of the current caused to flow through the FET results in that the source-to-drain voltage VDS of the FET becomes zero, a second threshold voltage is provided at this point, thereby turning OFF the FET.

Problems involved in this system are as follows.

<1> Since a total of the four comparators for detecting the source-to-drain voltage VDS of the FET needs to be provided, the circuit scale is increased.

<2> When the FET is turned ON, since an amount of change in the source-to-drain voltage VDS of the FET with respect to the current is very small, the turn-OFF timing is dispersed depending on the precision of the comparator, and as a result, the efficiency is reduced.

<3> Since the amount of change in the source-to-drain voltage VDS of the FET in the state of turning ON the FET is small, the system is readily influenced by the external noise in this state, which causes the malfunction.

Next, an operation of the power source apparatus 100 having the configuration described above will be described with reference to FIGS. 6 and 7.

Hereinafter, an outline of the operation of the entire system will be described.

In the following, the description will be given with the A.C.-D.C. converter 130 as the PFC converter.

Figure 6:
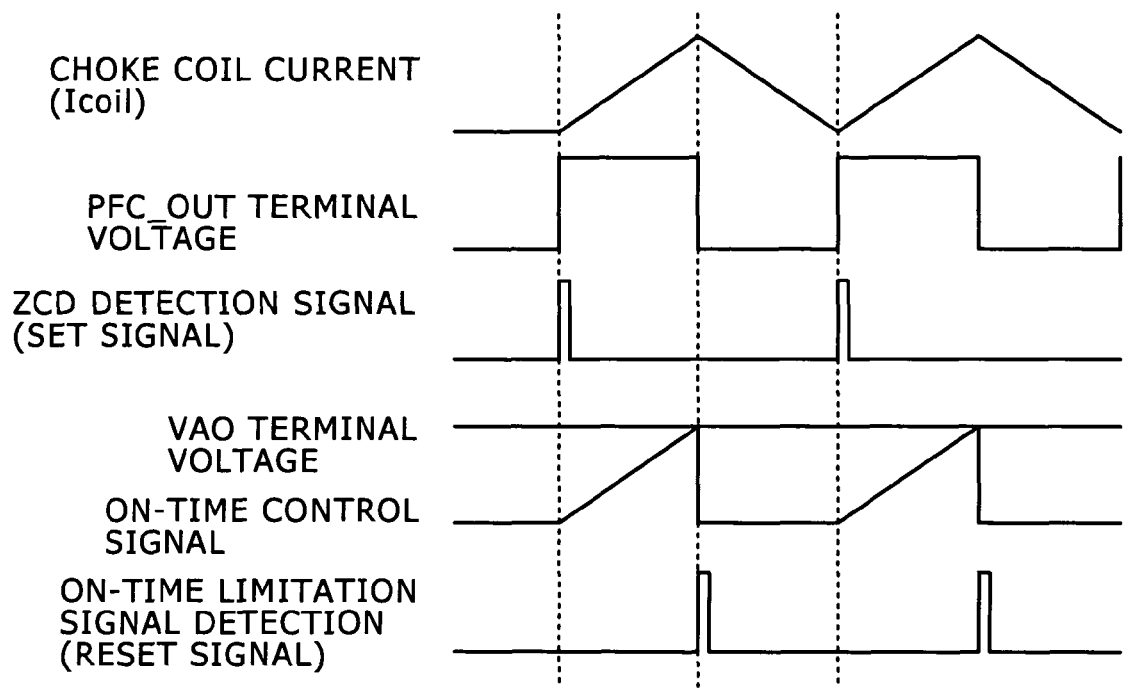
FIG. 6 is a timing chart explaining an operation of a critical-mode PFC converter.

FIG. 6 is a timing chart explaining an operation of a critical-mode PFC converter.

Figure 7:
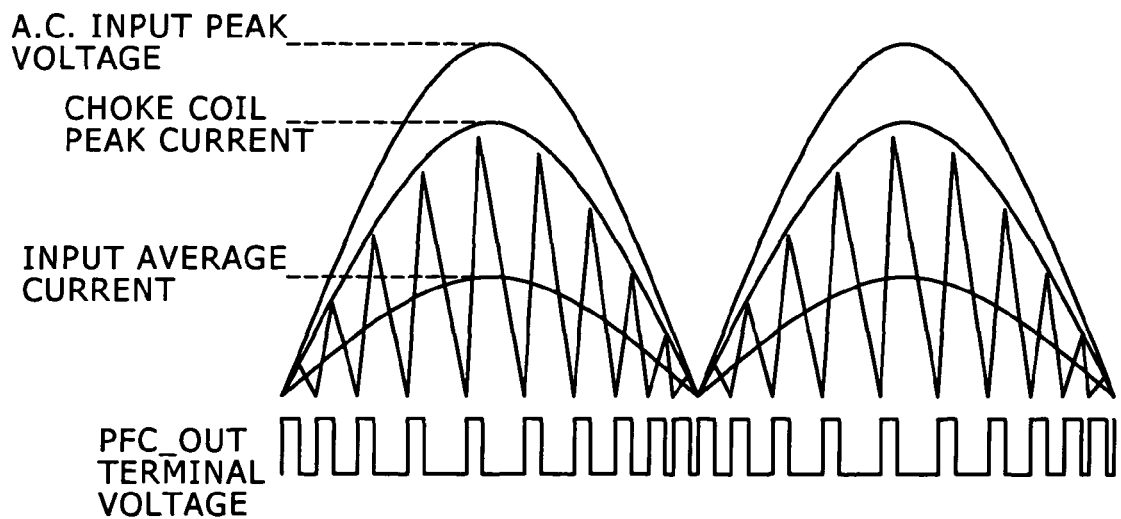
FIG. 7 is a chart showing waveforms of currents in the critical-mode PFC converter shown in FIG. 6.

FIG. 7 is a chart showing waveforms of currents in the critical-mode PFC converter.

[Outline of Operation of Entire System]

A signal supplied from the A.C. power source 110 is converted into the output voltage V130, as a D.C. voltage of about 400 V, of the A.C.-D.C. converter 130 by the A.C.-D.C. converter 130.

Also, the output voltage V130 from the A.C.-D.C. converter 130 is then converted into the voltage required for the electronic apparatus 200 by the insulated D.C.-D.C. converter 140 to be distributed to the electronic apparatus 200.

As previously stated, the PFC converter is generally used as the A.C.-D.C. converter 130. The PFC converter is controlled by the control IC 131.

Hereinafter, the operation of the critical-mode PFC converter will be described in relation to FIG. 3.

[Operation of Critical-Mode PFC Converter]

When the switching element SW131 is turned ON by the control IC 131, the current is caused to flow into the ground GND through both the choke coil L131 and the switching element SW131.

After a lapse of a period of time determined by the control IC 131, the switching element SW131 is turned OFF. When the switching element SW131 is turned OFF, the energy accumulated in the choke coil L131 is supplied to the output node ND131 through the diode D131.

The control IC 131 detects that the current being caused to flow through the choke coil L131 has become zero, and then turns ON the switching element SW131.

The ON-time of the switching element SW131 is controlled by the control IC 131 in accordance with the output voltage V130.

In a state in which the output voltage V130 is lower than a predetermined voltage, the ON-time is prolonged for boosting. On the other hand, in a state in which the output voltage V130 is higher than the predetermined voltage, the switching-OFF period of time continues.

In the operation described above, the current is caused to flow through the choke coil L131 in proportion to an instantaneous voltage of the input voltage obtained through the full-wave rectification in the rectifying current 121. As a result, it is possible to improve a power factor (refer to FIGS. 4A to 4F).

It is no object that the control circuit for the PFC converter and the D.C.-D.C. converter is composed of either an integrated control circuit or a separate control circuit.

As has been described, according to the embodiment of the present invention, the following effects can be obtained.

The circuit can be manufactured in smaller scale as compared with the related art.

The power source apparatus can be configured at the lower cost as compared with the related art because the winding is not required so much.

The power source apparatus is strong against the malfunction due to the noise or the like because the timing at which the FET is turned OFF corresponds to the falling edge of the drain-to-source voltage VDS of the FET on the opposite side.

It is possible to prevent the malfunction due to the simultaneous ON, and the deterioration of the efficiency because the FET on one side is turned ON after a lapse of the dead time after the FET on the opposite side is turned OFF.

The present application contains subject matter related to that disclosed in Japanese Priority Patent Application JP 2009-130099 filed in the Japan Patent Office on May 29, 2009, the entire content of which is hereby incorporated by reference.

It should be understood by those skilled in the art that various modifications, combinations, sub-combinations and alterations may occur depending on design requirements and other factors insofar they are within the scope of the appended claims or the equivalents thereof.

What is claimed is:

1. A power source apparatus utilizing a synchronous rectification system, comprising:
   a main transformer having a primary coil, and a first secondary coil and a second secondary coil having first ends connected to each other through a tap mutually electromagnetically coupled to said primary coil;
   a first field effect transistor having a drain connected to a second end of said first secondary coil, a source connected to a reference electric potential, and a gate to which a first drive signal is supplied;
   a second field effect transistor having a drain connected to a second end of said second secondary coil, a source connected to the reference electric potential, and a gate to which a second drive signal is supplied; and
   a gate driver configured to generate the first drive signal and the second drive signal in accordance with a drain voltage of said first field effect transistor and a drain voltage of said second field effect transistor, for driving said first field effect transistor and said second field effect transistor in a complementary style, wherein the first and second drive signals alternately turn on the first and second field effect transistors, such that the first field effect transistor is turned on when the second field effect transistor turns off, and the second field effect transistor turns on when the first field effect transistor turns off, and wherein said gate driver includes:

a first comparator for comparing a drain voltage of said first field effect transistor with a reference voltage;

a second comparator for comparing a drain voltage of said second field effect transistor with the reference voltage;

a first delay circuit for delaying the first drive signal by a previously set dead time;

a second delay circuit for delaying the second drive signal by the previously set dead time;

a first circuit for generating the second drive signal in accordance with an output signal from said first comparator, and the first drive signal delayed by said first delay circuit, and outputting the second drive signal to each of said gate of said second field effect transistor, and an input of said second delay circuit; and a second circuit for generating the first drive signal in accordance with an output signal from said second comparator, and the second drive signal delayed by said second delay circuit, and outputting the first drive signal to each of said gate of said first field effect transistor, and an input of said first delay circuit.

2. The power source apparatus according to claim 1, wherein the first field effect transistor turns on when the first drive signal is high and the second drive signal is low to provide current through the first field effect transistor while the second field effect transistor is off, and the second field effect transistor turns on when the second drive signal is high and the first drive signal is low to provide current through the second field effect transistor while the first field effect transistor is off.

3. The power source apparatus according to claim 1, wherein in said main transformer, in response to a resonance operation on the first end, pulses are induced in said first secondary coil and said second secondary coil on the second end, respectively, and a first current is caused to flow through said first field effect transistor, and a second current, 180° out of phase with the first current, is caused to flow through said second field effect transistor, said first and second current being alternately supplied to said tap.

4. A power source apparatus, comprising:

a first converter for converting an alternating current voltage into a first direct current voltage; and a second converter for converting the first direct current voltage obtained by said first converter into a second direct current voltage, said second comparator adopting a synchronous rectification system on a secondary side, said second comparator including a main transformer having a primary coil, and a first secondary coil and a second secondary coil having first ends connected to each other through a tap mutually electromagnetically coupled to said primary coil, a first field effect transistor having a drain connected to a second end of said first secondary coil, a source connected to a reference electric potential, and a gate to which a first drive signal is supplied, a second field effect transistor having a drain connected to a second end of said second secondary coil, a source connected to the reference electric potential, and a gate to which a second drive signal is supplied, and a gate driver for generating the first drive signal and the second drive signal in accordance with a drain voltage of said first field effect transistor and a drain voltage of said second field effect transistor, thereby driving said first field effect transistor and said second field effect transistor in a complementary style, wherein the first and second drive signals alternately turn on the first and second field effect transistors, such that the first field effect transistor is turned on when the second field effect transistor turns off, and the second field effect transistor turns on when the first field effect transistor turns off, and wherein said gate driver includes:

a first comparator for comparing a drain voltage of said first field effect transistor with a reference voltage;

a second comparator for comparing a drain voltage of said second field effect transistor with the reference voltage;

a first delay circuit for delaying the first drive signal by a previously set dead time;

a second delay circuit for delaying the second drive signal by the previously set dead time;

a first circuit for generating the second drive signal in accordance with an output signal from said first comparator, and the first drive signal delayed by said first delay circuit, and outputting the second drive signal to each of said gate of said second field effect transistor, and an input of said second delay circuit; and a second circuit for generating the first drive signal in accordance with an output signal from said second comparator, and the second drive signal delayed by said second delay circuit, and outputting the first drive signal to each of said gate of said first field effect transistor, and an input of said first delay circuit.

5. The power source apparatus according to claim 4, wherein the first field effect transistor turns on when the first drive signal is high and the second drive signal is low to provide current through the first field effect transistor while the second field effect transistor is off, and the second field effect transistor turns on when the second drive signal is high and the first drive signal is low to provide current through the second field effect transistor while the first field effect transistor is off.

6. The power source apparatus according to claim 4, wherein in said main transformer, in response to a resonance operation on the first end, pulses are induced in said first secondary coil and said second secondary coil on the second end, respectively, and a first current is caused to flow through said first field effect transistor, and a second current, 180° out of phase with the first current, is caused to flow through said second field effect transistor, said first and second current being alternately supplied to said tap.

* * * * *